United States Patent
Chiu et al.

(10) Patent No.: US 7,660,532 B2
(45) Date of Patent: Feb. 9, 2010

(54) OPTICAL TRANSCEIVER MODULE AND CALIBRATION METHOD THEREOF

(75) Inventors: Chien-Shu Chiu, Taoyuan Hsien (TW); Yung-Yuan Cheng, Taoyuan Hsien (TW); Chiung-Hung Wang, Taoyuan Hsien (TW); Chih-Hsiao Chen, Taoyuan Hsien (TW)

(73) Assignee: Delta Electronics Inc., Taoyuan Hsien (TW)

( * ) Notice: Subject to any disclaimer, the term of this patent is extended or adjusted under 35 U.S.C. 154(b) by 486 days.

(21) Appl. No.: 11/542,183

(22) Filed: Oct. 4, 2006

(65) Prior Publication Data

US 2007/0081824 A1    Apr. 12, 2007

(30) Foreign Application Priority Data

Oct. 7, 2005    (TW) .............................. 94135036 A

(51) Int. Cl.
*H04B 10/00* (2006.01)
*H04B 10/08* (2006.01)

(52) U.S. Cl. .......................... 398/136; 398/138; 398/22
(58) Field of Classification Search ................ 398/136, 398/135, 138, 137, 139, 128, 130, 202, 22; 455/73; 324/96; 73/1.01
See application file for complete search history.

(56) References Cited

U.S. PATENT DOCUMENTS

| | | | |
|---|---|---|---|
| 2003/0219260 A1* | 11/2003 | Chiou et al. | 398/202 |
| 2005/0249508 A1* | 11/2005 | Volz et al. | 398/195 |
| 2007/0025230 A1* | 2/2007 | Chang | 369/116 |

* cited by examiner

*Primary Examiner*—M. R. Sedighian
(74) *Attorney, Agent, or Firm*—Birch, Stewart, Kolasch & Birch, LLP

(57) ABSTRACT

A calibration method of an optical transceiver module includes the steps of receiving an input voltage, detecting an optical signal for generating an input power based on the optical signal, generating a compensating power based on the input voltage, and generating a calibrating power based on the compensating power and the input power.

17 Claims, 6 Drawing Sheets

OPTICAL TRANSCEIVER MODULE AND CALIBRATION METHOD THEREOF

BACKGROUND OF THE INVENTION

1. Field of Invention

The invention relates to an optical transceiver module and a calibration method thereof, and in particular, to an optical transceiver module capable of calibrating an operation voltage and a calibration method thereof.

2. Related Art

The optical communication technology has gradually become a mainstream in the communication technology because it has the advantages of low radiation and high transmission speed.

FIG. 1 is a schematic block diagram showing a conventional optical transceiver module 1. Referring to FIG. 1, the optical transceiver module 1 has a receiving unit 11, a transmitting unit 13 and a control unit 15. The receiving unit 11 receives an external optical signal 111, and converts the optical signal 111 into an electric signal 112. The control unit 15 transmits the electric signal 112 to a host 10. In addition, the control unit 15 controls the transmitting unit 13, converts a data signal 131, which is an electric signal coming from the host 10, into an optical signal, and then transmits the optical signal out. However, the gain and the offset of the receiving unit 11 of the optical transceiver module 1 may fluctuate due to different compositions. In addition, the RSSI (Received Signal Strength Indicator) of the optical transceiver module 1 may cause influence due to the fluctuation of the operation voltage of the receiving unit 11. For example, when the operation voltage is insufficient, the RSSI of the optical transceiver module 1 may be poor such that the overall sensitivity of the optical transceiver module 1 is poor.

The prior art has improved the problems caused by the variations of the internal elements of the receiving unit 11 by adding gain compensation and offset compensation to the optical transceiver module 1. However, the influence caused by the fluctuation of the operation voltage still cannot be solved. Thus, it is an important subject of the invention to provide an optical transceiver module capable of calibrating the operation voltage and a calibration method thereof.

SUMMARY OF THE INVENTION

In view of the foregoing, the invention is to provide an optical transceiver module capable of calibrating an operation voltage and preventing the influence caused by the fluctuation of the operation voltage, and a calibration method thereof.

To achieve the above, a calibration method of an optical transceiver module of the invention includes the following steps of: receiving an input voltage; detecting an optical signal for generating an input power based on the optical signal; generating a compensating power based on the input voltage; and generating a calibrating power based on the compensating power and the input power.

To achieve the above, the invention discloses another calibration method of an optical transceiver module. The method includes the steps of: receiving an input voltage; generating a compensation voltage based on the input voltage; and generating a calibration voltage based on the input voltage and the compensation voltage.

To achieve the above, an optical transceiver module of the invention includes a receiving unit, a calibration unit and a control unit. The receiving unit receives an external input voltage. The calibration unit generates a calibration voltage based on the input voltage. The control unit generates a corresponding calibrating power based on the calibration voltage.

As mentioned above, the optical transceiver module and the calibration method thereof according to the invention generate a calibrating power or voltage to compensate for and calibrate the fluctuation of the operation voltage, and thus to avoid the influence caused by the operation voltage.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
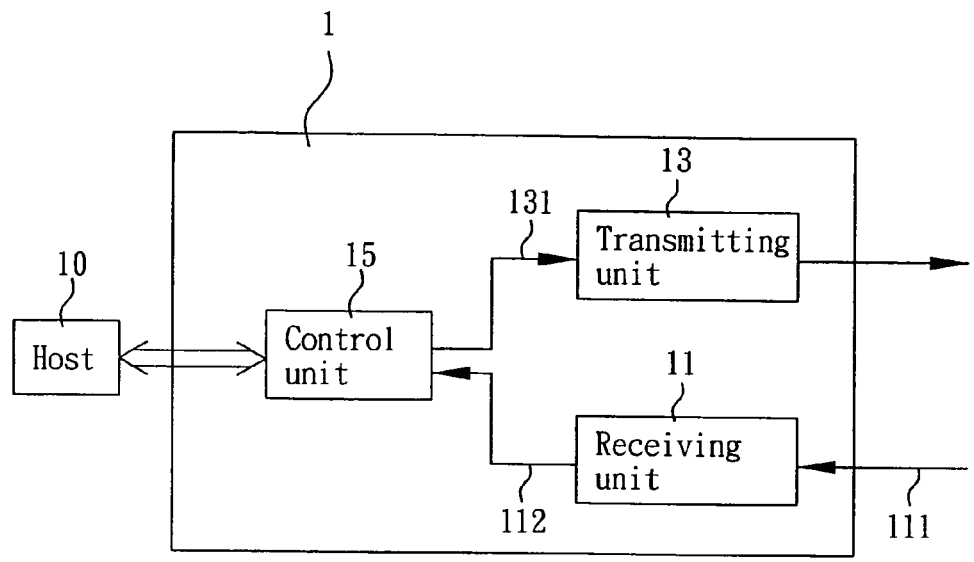
FIG. 1 is a schematic block diagram showing a conventional optical transceiver module.
Figure 2:
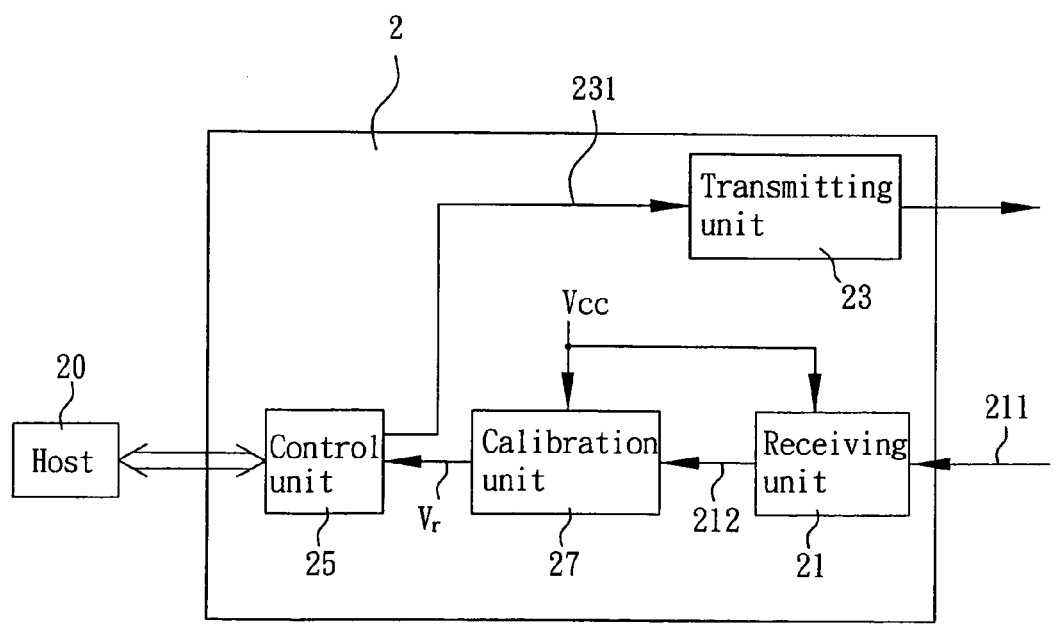
FIG. 2 is a schematic block diagram showing an optical transceiver module according to a preferred embodiment of the invention.
Figure 3:
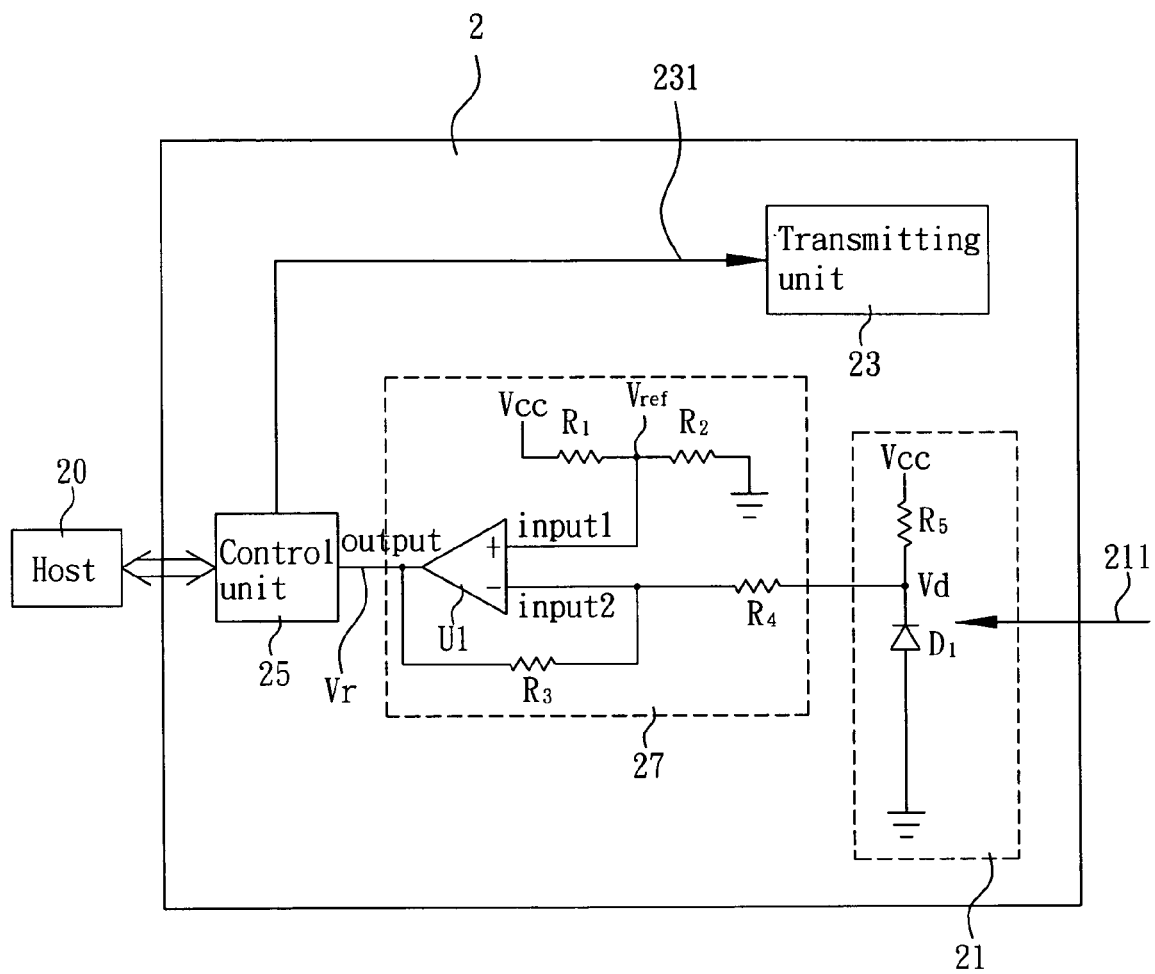
FIG. 3 is a circuit diagram showing the optical transceiver module according to the preferred embodiment of the invention.

FIGS. 2 and 3 are respectively a schematic block diagram and a circuit diagram showing an optical transceiver module 2 according to a preferred embodiment of the invention. Referring to FIGS. 2 and 3, the optical transceiver module 2 receives an input voltage $V_{cc}$ as an operation voltage. The optical transceiver module 2 includes a receiving unit 21, a transmitting unit 23, a control unit 25 and a calibration unit 27.

The receiving unit 21 receives the input voltage $V_{cc}$ and an external optical signal 211, and converts the optical signal 211 into an electric signal 212. The calibration unit 27 generates a calibration voltage $V_r$ based on the input voltage $V_{cc}$. That is, when the fluctuation of the input voltage $V_{cc}$ is too high or too low, the compensation is made for the purpose of calibration.

The control unit 25 generates a corresponding calibrating power based on the calibration voltage $V_r$ and transmits the calibrating power to a host 20. The control unit 25 controls the transmitting unit 23 to convert a data signal 231, which comes from the host 20 and is an electric signal, into an optical signal and then transmit the optical signal out.

Referring to FIG. 3, the receiving unit 21 of this embodiment has a fifth resistor $R_5$ and a light receiving element $D_1$. The fifth resistor $R_5$ has a first terminal for receiving the input voltage $V_{cc}$, and a second terminal electrically connected to a first terminal of the light receiving element $D_1$. A second terminal of the light receiving element $D_1$ is grounded. The first terminal of the light receiving element $D_1$ generates a detection voltage $V_d$, which equals a difference between the input voltage $V_{cc}$ and the electric signal sensed by the light receiving element $D_1$.

The calibration unit 27 has a first resistor $R_1$, a second resistor $R_2$, an OP amplifier $U_1$, a third resistor $R_3$, and a fourth resistor $R_4$. The first resistor $R_1$ has a first terminal for receiving the input voltage $V_{cc}$, and a second terminal electrically connected to a first terminal of the second resistor $R_2$. A second terminal of the second resistor $R_2$ is grounded to form a voltage-dividing circuit. The first terminal of the second resistor $R_2$ generates a reference voltage $V_{ref}$, as the following:

$$V_{ref} = \frac{R_2}{R_1 + R_2} \times V_{cc},$$

Where, $V_{ref}$ is the voltage value of the reference voltage, $R_1$ is the resistance of the first resistor, $R_2$ is the resistance of the second resistor, and $V_{cc}$ is the voltage value of the input voltage.

In this embodiment, the reference voltage $V_{ref}$ is an optimum operation voltage of the optical transceiver module 2. That is, the optical transceiver module 2 has a better RSSI (Received Signal Strength Indicator) when it works under the optimum operation voltage. It is to be noted that the reference voltage $V_{ref}$ can be adjusted based on different optical transceiver modules 2. Adjusting the resistance of each of the first resistor $R_1$ and the second resistor $R_2$ can make the reference voltage $V_{ref}$ have different voltage values.

The OP amplifier $U_1$ has a first input terminal $input_1$, a second input terminal $input_2$ and an output terminal "output". In this embodiment, the first input terminal $input_1$, is a non-inverting input terminal, the second input terminal $input_2$ is an inverting input terminal, and the first input terminal $input_1$ is electrically connected to the first terminal of the second resistor $R_2$ to receive the reference voltage $V_{ref}$.

The third resistor $R_3$ has a first terminal electrically connected to the output-terminal "output" and a second terminal electrically connected to the second input terminal $input_2$. The fourth resistor $R_4$ has a first terminal electrically connected to the second input terminal $input_2$, and a second terminal electrically connected to the receiving unit 21 to receive the detection voltage $V_d$.

In addition, the OP amplifier $U_1$ generates a calibration voltage $V_r$ based on the reference voltage $V_{ref}$ and the detection voltage $V_d$. The calibration voltage $V_r$ is as the following:

$$V_r = \frac{R_2}{R_1 + R_2} \times \frac{R_3 + R_4 + R_5}{R_4 + R_5} \times V_{cc} - \frac{R_3}{R_4 + R_5} \times V_{cc} - \frac{R_3}{R_4} V_d,$$

Where, $V_r$ is a voltage value of the calibration voltage, $V_{cc}$ is the voltage value of the input voltage, $V_d$ is the voltage value of the detection voltage, $R_1$ is the resistance of the first resistor, $R_2$ is the resistance of the second resistor, $R_3$ is the resistance of the third resistor, $R_4$ is the resistance of the fourth resistor, and $R_5$ is the resistance of the fifth resistor.

In this embodiment, it is assumed that $R_4+R_5=R_1$, $R_3=R_2$. Thus, $$V_r = \frac{R3}{R4} V d,$$

and it is obtained that the calibration voltage $V_r$ is ideally free from being influenced by the input voltage $V_{cc}$. Thus, the optical transceiver module 2 is free from being influenced by the input voltage $V_{cc}$, and the effect of calibration can be achieved.

The control unit 25 is electrically connected to the calibration unit 27 and converts the calibration voltage $V_r$, which is transmitted by the calibration unit 27, into a corresponding calibrating power. In addition, the control unit 25 compensates for the gain and the offset of the calibrating power, and sends the compensated result to the host 20 for performing the subsequent processes.

The optical transceiver module 2 of this embodiment utilizes the calibration unit 27 to generate the calibration voltage $V_r$, and is thus free from being influenced by the fluctuation (too low or too high) of the input voltage $V_{cc}$. Therefore, the effect of calibrating the operation voltage can be achieved.

Figure 4:
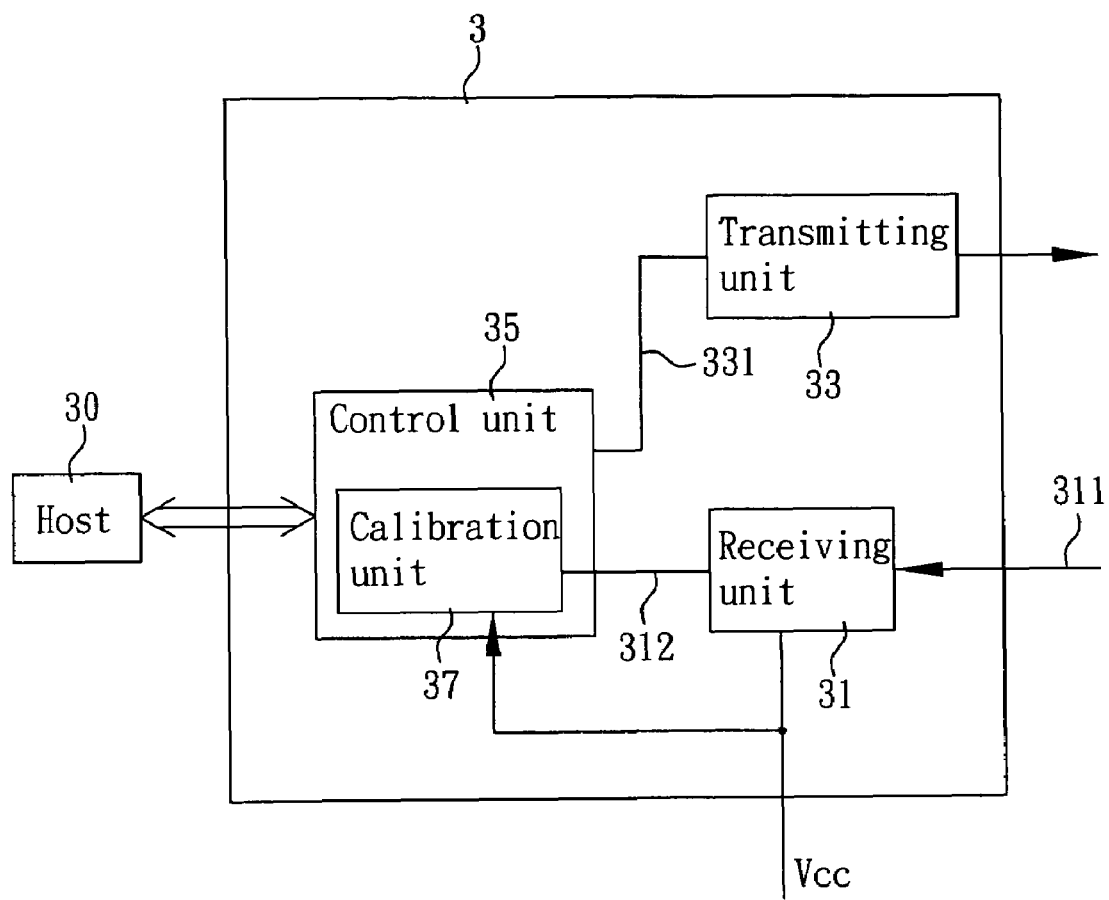
FIG. 4 is a schematic block diagram showing an optical transceiver module according to another preferred embodiment of the invention.

FIG. 4 is a schematic block diagram showing an optical transceiver module 3 according to another preferred embodiment of the invention. Referring to FIG. 4, the optical transceiver module 3 receives an input voltage $V_{cc}$ as an operation voltage and has a receiving unit 31, a transmitting unit 33, a control unit 35 and a calibration unit 37.

In this embodiment, the receiving unit 31 receives the input voltage $V_{cc}$ and an external optical signal 311, and converts the optical signal 311 into an electric signal 312. The transmitting unit 33 converts a data signal 331, which is an electric signal coming from a host 30, into an optical signal with the control unit 35.

The control unit 35 may be a control chip for receiving the electric signal 312, which is transmitted from the receiving unit 31, transmitting the electric signal 312 to the host 30, and transmitting the data signal 331 from the host 30 to the transmitting unit 33.

The calibration unit 37 fluctuates based on the input voltage $V_{cc}$, generates a corresponding calibration voltage, and transmits the calibration voltage to the control unit 35. The control unit 35 generates a corresponding calibrating power based on the calibration voltage and transmits the calibrating power to the host 30. In this embodiment, the calibration unit 37 is a software module stored in the control unit 35. Of course, the calibration unit 37 may also be stored in another control chip individually.

The calibration steps of the optical transceiver module 3 of this embodiment will be described in the following. First, the optical transceiver module 3 receives the input voltage $V_{cc}$ as the operation voltage. Next, the calibration unit 37 detects the input voltage $V_{cc}$ to generate a compensation voltage. If $V_1$ is the compensation voltage, $V_{ref}$ is a reference voltage, $V_{cc}$ is the input voltage, and $P_1$ is a predetermined parameter, then $V_1=(V_{ref}-V_{cc}) \times P_1$.

In this embodiment, the reference voltage $V_{ref}$ is an optimum operation voltage of the optical transceiver module 3. The predetermined parameter $P_1$ represents a constant for the relationship between the input voltage $V_{cc}$ and the electric signal generated by the light receiving element $D_1$, and the predetermined parameter $P_1$ is the experimental data obtained after several experiments.

Next, the calibration unit 37 generates a calibration voltage based on the input voltage $V_{cc}$ and the compensation voltage.

The calibration voltage equals a sum of the input voltage $V_{cc}$ and the compensation voltage.

Finally, the control unit 35 receives the calibration voltage and generates a corresponding calibrating power based on the calibration voltage. In addition, the control unit 35 compensates for the gain and the offset of the calibrating power, and then sends the compensated result to the host 30 for performing the subsequent processes.

When the input voltage $V_{cc}$ fluctuates, the calibration unit 37 generates a compensation voltage to compensate for the fluctuation of the input voltage $V_{cc}$, and thus achieves the effect of calibrating the operation voltage.

Figure 5:
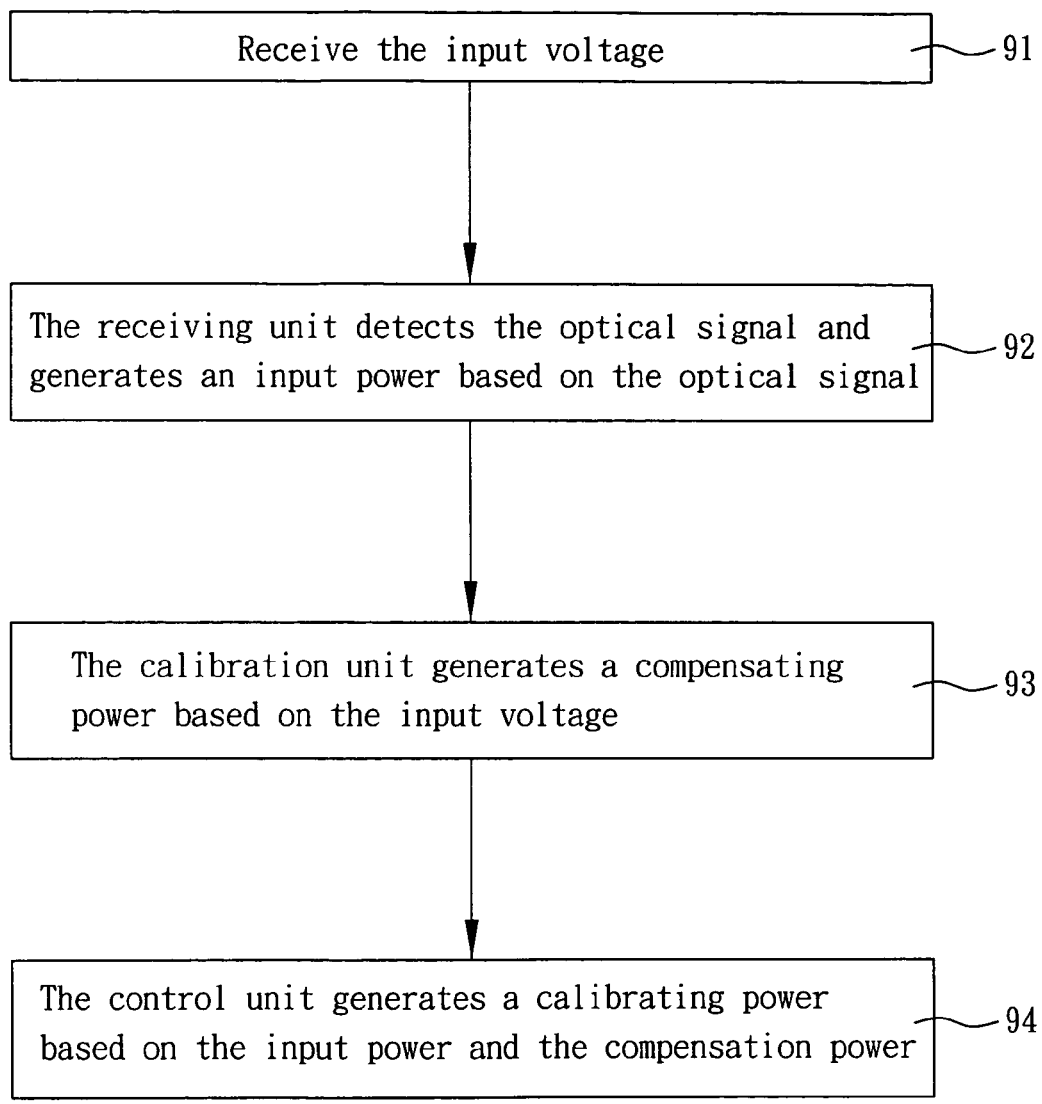
FIG. 5 is a flow chart showing a calibration method of the optical transceiver module according to a preferred embodiment of the invention.

FIG. 5 is a flow chart showing a calibration method of the optical transceiver module, which may be implemented in the optical transceiver module 3 according to the preferred embodiment of the invention of, for example, FIG. 4. The calibration method includes the following steps 91 to 94.

In step 91, the optical transceiver module 3 receives the input voltage $V_{cc}$ as the operation voltage.

In step 92, the receiving unit 31 detects the optical signal 311 and generates an input power based on the optical signal 311. In this step 92, the level of the input power depends on the intensity of the optical signal 311.

In step 93, the calibration unit 37 generates a compensating power based on the input voltage. If $W_2$ is the compensating power, $V_{ref}$ is the reference voltage, $V_{cc}$ is the input voltage, and $P_2$ is a predetermined parameter, then $W_2=(V_{ref}-V_{cc}) \times P_2$. In this embodiment, the compensating power is a power value, and the reference voltage $V_{ref}$ is an optimum operation voltage of the optical transceiver module 3. The predetermined parameter $P_2$ with the unit of watt/volts represents the parameter for the relationship between the input voltage $V_{cc}$ and the electric signal generated by the light receiving element $D_1$. In addition, the predetermined parameter $P_2$ is the experimental data obtained after several experiments are made.

In step 94, the control unit 35 generates a calibrating power based on the input power and the compensation power, and then compensates for the gain and the offset. In this step 94, the calibrating power equals a sum of the input power and the compensating power.

When the input power generated by the receiving unit 31 fluctuates with the fluctuation of the input voltage $V_{cc}$, the calibration unit 37 generates the compensating power to compensate for the fluctuation of the input power and thus achieves the effect of calibration.

Figure 6:
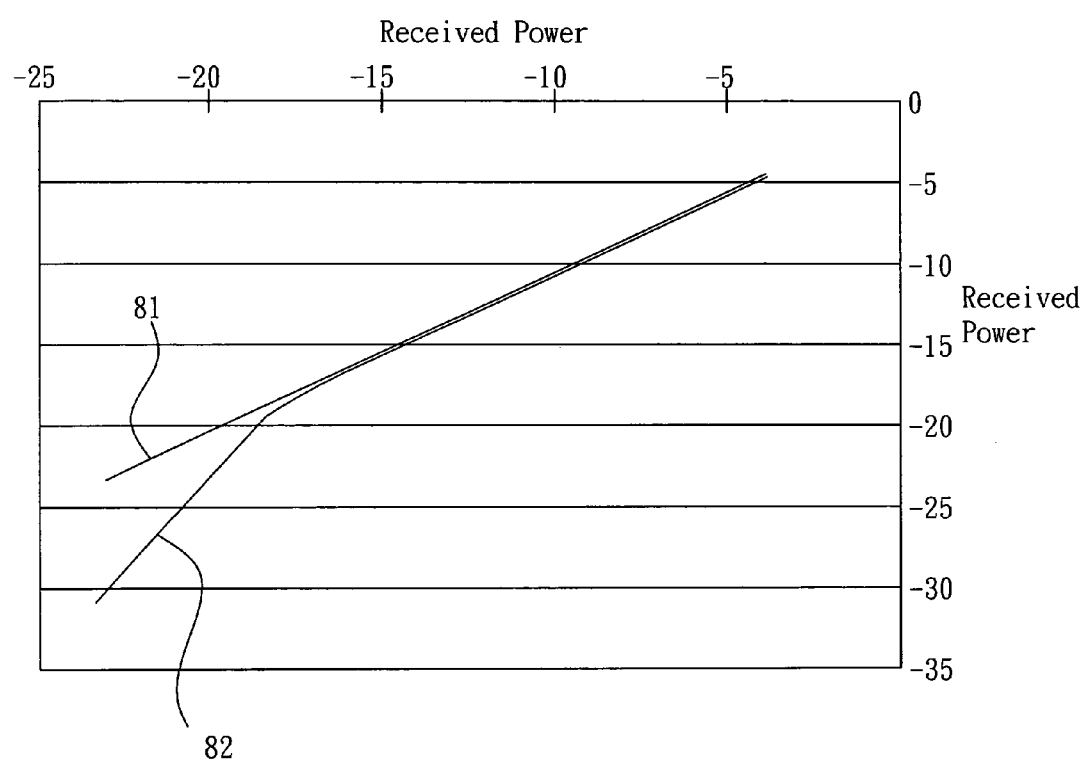
FIGS. 6 and 7 are schematic illustrations showing measurements of sensitivity curves corresponding to the optical transceiver module of FIG. 4.
Figure 7:
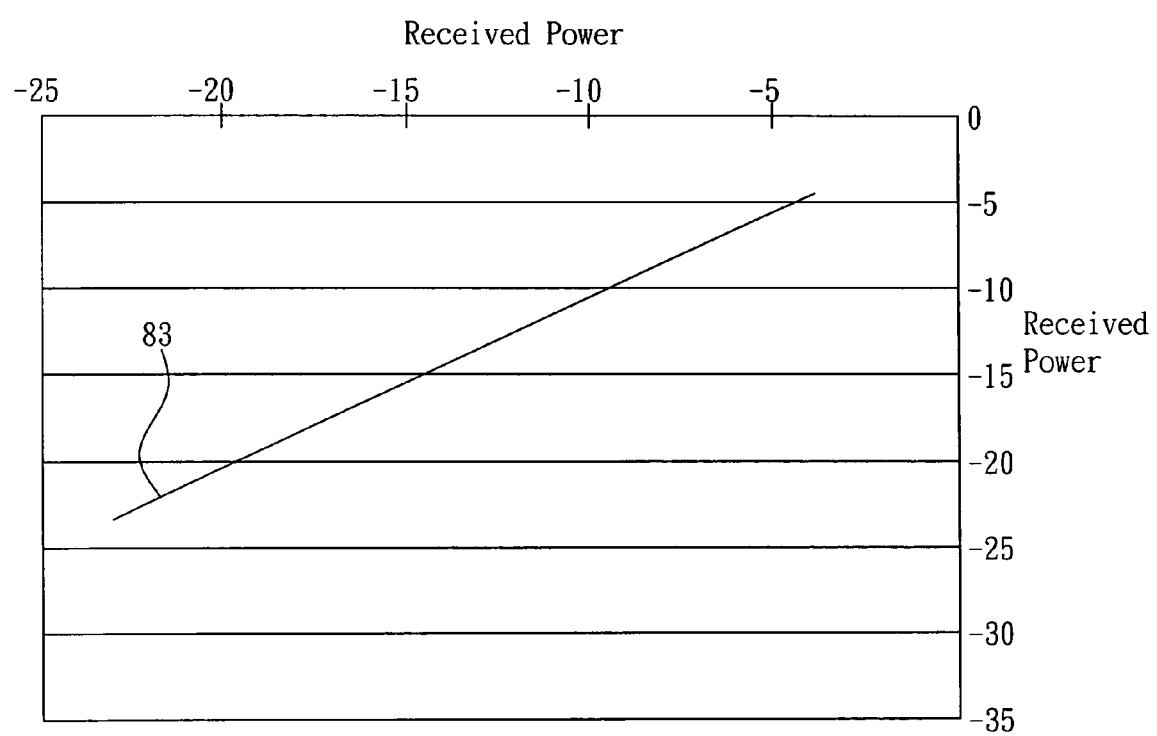

FIGS. 6 and 7 are schematic illustrations showing measurements of sensitivity curves corresponding to the optical transceiver module 3 of FIG. 4. It is assumed that the optimum operation voltage of the optical transceiver module 3 is 5V. As shown in FIG. 6, a curve 81 represents the sensitivity curve when the optical transceiver module 3 works at 5V, and a curve 82 represents the sensitivity curve when the optical transceiver module 3 works at 4.75V without calibration. As shown in FIG. 7, a curve 83 represents the sensitivity curve when the optical transceiver module 3 works at 4.75V after calibration. As shown in FIG. 6, when the received power of the optical transceiver module 3 is at −20 dBm and no calibration is made, the sensitivity decreases and cannot be held within the specification of +/−3 dBm. As shown in FIG. 7, the sensitivity still can be held within the specification of +/−3 dBm after the calibration even if the input voltage fluctuates to 4.75V, and the influence caused by the fluctuation of the operation voltage can be avoided.

In summary, the optical transceiver module and the calibration method thereof according to the invention generate a calibrating power or voltage to compensate for and calibrate the fluctuation of the operation voltage, and thus avoid the influence caused by the operation voltage.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A calibration method of an optical transceiver module, comprising the steps of:
   receiving an input voltage;
   detecting an optical signal for generating an input power based on the optical signal;
   setting a reference voltage;
   providing a predetermined parameter;
   generating a compensating power based on the reference voltage, the input voltage and the predetermined parameter; and
   generating a calibrating power based on the compensating power and the input power.

2. The method according to claim 1, wherein the compensating power equals a product of the predetermined parameter and a difference between the reference voltage and the input voltage.

3. The method according to claim 1, wherein the reference voltage is an optimum operation voltage of the optical transceiver module.

4. The method according to claim 1, further comprising the steps of: compensating an offset of the optical transceiver module; and compensating a gain of the optical transceiver module.

5. A calibration method of an optical transceiver module, comprising the steps of:
   receiving an input voltage by an optical receiver in the optical transceiver module;
   setting a reference voltage;
   providing a predetermined parameter:
   generating a compensation voltage based on the reference voltage, the input voltage and the predetermined parameter; and
   generating a calibration voltage based on the input voltage and the compensation voltage.

6. The method according to claim 5, further comprising the step of: generating a calibrating power based on the calibration voltage.

7. The method according to claim 5, wherein the compensating power equals a product of the predetermined parameter and a difference between the reference voltage and the input voltage.

8. The method according to claim 5, wherein the reference voltage is an optimum operation voltage of the optical transceiver module.

9. The method according to claim 5, further comprising the steps of: compensating an offset of the optical transceiver module; and compensating a gain of the optical transceiver module.

10. An optical transceiver module, comprising:
    a transmitting unit;
    a receiving unit receiving an external input voltage and an external optical signal;
    a calibration unit generating a calibration voltage based on the external input voltage; and
    a control unit generating a corresponding calibrating power based on the calibration voltage, and controlling the transmitting unit to convert a data signal to an optical signal to be transmitted out of the optical transceiver module.

11. The optical transceiver module according to claim 10, wherein the calibration unit comprises an OP amplifier having a first input terminal for receiving a reference voltage, a second input terminal for receiving the input voltage and an output terminal for generating the calibration voltage.

12. The optical transceiver module according to claim 10, wherein the calibration unit comprises:
   a first resistor having a first terminal for receiving the input voltage and a second terminal for generating a reference voltage;
   a second resistor having a second terminal and a first terminal electrically connected to the second terminal of the first resistor;
   an OP amplifier having a first input terminal, an output terminal, and a second input terminal, wherein the first input terminal is electrically connected to the second terminal of the first resistor;
   a third resistor having a first terminal electrically connected to the output terminal of the OP amplifier and a second terminal electrically connected to the second input terminal of the OP amplifier; and
   a fourth resistor having a first terminal electrically connected to the second input terminal of the OP amplifier and a second terminal electrically connected to the receiving unit.

13. The optical transceiver module according to claim 12, wherein the first input terminal is a non-inverting input terminal and the second input terminal is an inverting input terminal.

14. The optical transceiver module according to claim 10, wherein the receiving unit comprises:
   a resistor having a second terminal and a first terminal of the input voltage; and
   a light receiving element electrically connected to the second terminal of the resistor.

15. The optical transceiver module according to claim 10, wherein the control unit compensates an offset of the optical transceiver module and a gain of the optical transceiver module.

16. The optical transceiver module according to claim 10, wherein the control unit is a control chip.

17. The optical transceiver module according to claim 10, wherein the calibration unit is a software module stored in a chip.

* * * * *